(12) United States Patent
Rapaport

(10) Patent No.: US 7,372,900 B2
(45) Date of Patent: May 13, 2008

(54) METHOD AND SYSTEM FOR SELECTING AN OPTIMAL ASYMMETRIC DIGITAL SUBSCRIBER LINE MODE

(75) Inventor: Albert Rapaport, Morganville, NJ (US)

(73) Assignee: Brooktree Broadband Holding, Inc., Newport Beach, CA (US)

( * ) Notice: Subject to any disclaimer, the term of this patent is extended or adjusted under 35 U.S.C. 154(b) by 888 days.

(21) Appl. No.: 10/721,259

(22) Filed: Nov. 26, 2003

(65) Prior Publication Data

US 2005/0111534 A1 May 26, 2005

(51) Int. Cl.
*H04B 1/38* (2006.01)
(52) U.S. Cl. ....................... 375/222; 375/223
(58) Field of Classification Search ................ 375/222, 375/224–226, 223; 370/282; 379/399.01
See application file for complete search history.

(56) References Cited

U.S. PATENT DOCUMENTS

| | | | |
|---|---|---|---|
| 6,130,882 A | 10/2000 | Levin | |
| 6,292,515 B1 | 9/2001 | Kao et al. | |
| 6,449,261 B1 | 9/2002 | Humphrey | |
| 6,587,502 B1 | 7/2003 | Hendrichs et al. | |
| 6,650,658 B1 | 11/2003 | Mueller et al. | |
| 6,775,241 B1 | 8/2004 | Levin | |
| 6,970,501 B1 * | 11/2005 | Bremer et al. | ............... 375/222 |
| 2003/0117963 A1 | 6/2003 | Wang | |
| 2005/0031025 A1 | 2/2005 | Xie et al. | |

\* cited by examiner

*Primary Examiner*—Mohammed Ghayour
*Assistant Examiner*—Lawrence Williams
(74) *Attorney, Agent, or Firm*—Thomas, Kayden, Horstemeyer & Risley LLP

(57) ABSTRACT

A method and system of the present inventions are directed to selecting an optimal mode for ADSL operation based near/far end modem capability, loop length and capacity in the upper bands of modes of operation. A method for switching among a plurality of modes for ADSL modem operation may include the steps of determining a far end modem's capability for supporting one or more of a base mode, a first mode and a second mode; determining a loop length between a near end modem and the far end modem; determining a capacity in an upper band of the first mode and the second mode; and selecting an appropriate mode based on a combination of the far end modem's capability, the loop length and the capacity in the upper band.

23 Claims, 4 Drawing Sheets

US 7,372,900 B2

METHOD AND SYSTEM FOR SELECTING AN OPTIMAL ASYMMETRIC DIGITAL SUBSCRIBER LINE MODE

FIELD OF THE INVENTION

The present invention relates generally to mode selection, more particularly, to a method and system for selecting an optimal ADSL mode of operation based on a combination of modem capability, loop length and upper band capacity.

BACKGROUND OF THE INVENTION

With the increasing popularity of the Internet and other content-heavy electronic communication systems, there has been a substantial need for reliable and affordable high bandwidth mediums for facilitating data transmissions between service providers and their customers. In relation to the requirement that such mediums be affordable to consumers, a cost-effective manner for providing service to customers involves using infrastructure already present in most locations. Accordingly, over recent years, the two such mediums most widely meeting these requirements include cable television (CATV) and conventional copper wire telephone systems (plain old telephone system or POTS).

Relating specifically to the adaptation of POTS telephone lines to carry data at high-bandwidth or 'broadband' data rates, a number of Digital Subscriber Line (DSL) standards and protocols have been proposed. DSL essentially operates by formatting signals using various Time Domain Equalization techniques to send packets over copper wire at high data rates. A substandard of conventional DSL is known as Asymmetric Digital Subscriber Line (ADSL) and is considered advantageous for its ability to provide very high data rates in the downstream (i.e., from service provider to the user) direction by sacrificing speed in the upstream direction. Consequently, end user costs are minimized by providing higher speeds in the most commonly used direction. Further, ADSL provides a system that applies signals over a single twisted-wire pair that simultaneously supports conventional POTS or Integrated Services Digital Network (ISDN) service as well as high-speed duplex (simultaneous two-way) digital data services.

Two of the proposed standards for ADSL are set forth by the International Telecommunications Union, Telecommunication Standardization Section (ITU-T). A first, conventional, ADSL standard is described in ITU-T Recommendation G.992.1—"Asymmetric Digital Subscriber Line (ADSL) Transceivers", the body of which is incorporated herein by reference. A second, more recently proposed standard is the G.992.2 or 'G.lite' standard, further described in ITU-T Recommendation G.992.2—"Splitterless Asymmetric Digital Subscriber Line (ADSL) Transceivers", also bodily incorporated by reference herein. The G.lite standard is a variant of the G.992.1 standard, with modifications directed primarily to work in a splitterless environment (i.e., without a splitter at the remote user end to separate the voice traffic from the digital data traffic).

Prior to any transmission of actual data between the CO (ADSL Transceiver Unit-Central (ATU-C)) and the remote computer (ADSL Transceiver Unit-Remote (ATU-R)), the two entities must first undergo an initialization procedure designed to familiarize the two entities with each other, identify the bandwidth capabilities for the current session, and further facilitate the establishment of a valid connection. Pursuant to ADSL standards provided by the International Telecommunication Union—Telecommunication Standardization Sector (ITU-T), these initialization procedures comprise the following: 1) a handshake procedure; 2) a transceiver training session; 3) a channel analysis session; 4) an exchange session; and finally 5) an actual data transmission session referred to as 'showtime'.

Specifics of the handshake procedure are set forth in ITU-T Recommendation G.994.1—"Handshake Procedures for Digital Subscriber Line (DSL) Transceivers", the body of which is incorporated by reference herein. The handshake procedure is designed to enable peer components to initiate a communications session between each other and generally includes the exchange of several specific types of messages having predetermined formats. Examples of such messages include the following: capabilities list and capabilities list request messages; mode select and mode request messages; various acknowledge and negative acknowledge messages, etc. Each of the above messages is generally formulated by a protocol processor responsible for making sure that the requirements for protocol communication are complied with.

Because the various ITU-T recommendations identified above are designed to provide guidance to ADSL developers in various geographic locations, different circumstances may exist which impact the method with which the general recommendations are implemented. Accordingly, Annexes have been created to each specification that specifically itemize the effect of particular scenarios upon the adoption of the general recommendations.

Different modes of operation are available in ADSL transmissions; more specifically as set forth by the ITU Recommendation G.992.5—"Asymmetric Digital Subscriber Line (ADSL) Transceivers" the body of which is incorporated herein by reference. With emerging technology, modes of operation directed to higher data rates and greater bandwidth may become more readily available. However, the act of switching between or among modes of operation requires careful consideration of circumstances, otherwise, the switching of modes results in greater inefficiencies and wasted resources. There may be circumstances where a mode of operation providing a higher data rate is used when one of the modems are is capable of transmission at higher data rates, thereby resulting in wasted and underutilized resources.

Therefore, there is a need in the art of ADSL systems for a more efficient method and system for selecting an optimal mode based on certain conditions.

SUMMARY OF THE INVENTION

Aspects of the present inventions overcome the problems noted above, and realize additional advantages. In accordance with an exemplary embodiment, a method for switching among a plurality of modes for ADSL modem operation comprises the steps of: determining a far end modem's capability for supporting one or more of a base mode, a first mode and a second mode; determining a loop length between a near end modem and the far end modem; determining a capacity in an upper band of the first mode and the second mode; and selecting an appropriate mode based on a combination of the far end modem's capability, the loop length and the capacity in the upper band.

In accordance with other aspects of this exemplary embodiment, the near end modem and the far end modem are trained in the base mode upon initial power up; the step of determining the capacity in the upper band further comprises determining whether the capacity in an upper 256 bins is below a threshold; the step of determining the capacity in the upper band further comprises determining whether the capacity in an upper 512 bins is below a threshold; the base mode is an Annex mode; the first mode is ADSL Plus; the second mode is ADSL Quad; the step of determining an appropriate mode is performed at a CO end; the steps are performed during a handshake/training session; the loop length is determined by a received power level calculation; and the capacity in the upper band is determined at the far end modem and transmitted to the near end modem.

In accordance with another exemplary embodiment, a system for switching among a plurality of modes for ADSL modem operation comprises a module for determining a far end modem's capability for supporting one or more of a base mode, a first mode and a second mode; a module for determining a loop length between a near end modem and the far end modem; and a module for determining a capacity in an upper band of the first mode and the second mode; wherein an appropriate mode is selected based on a combination of the far end modem's capability, the loop length and the capacity in the upper band.

The accompanying drawings, which are incorporated in and constitute a part of this specification, illustrate various embodiments of the inventions and, together with the description, serve to explain the principles of the inventions.

BRIEF DESCRIPTION OF THE DRAWINGS

The present inventions can be understood more completely by reading the following Detailed Description of the Invention, in conjunction with the accompanying drawings, in which.

DETAILED DESCRIPTION OF THE INVENTION

Figure 1:
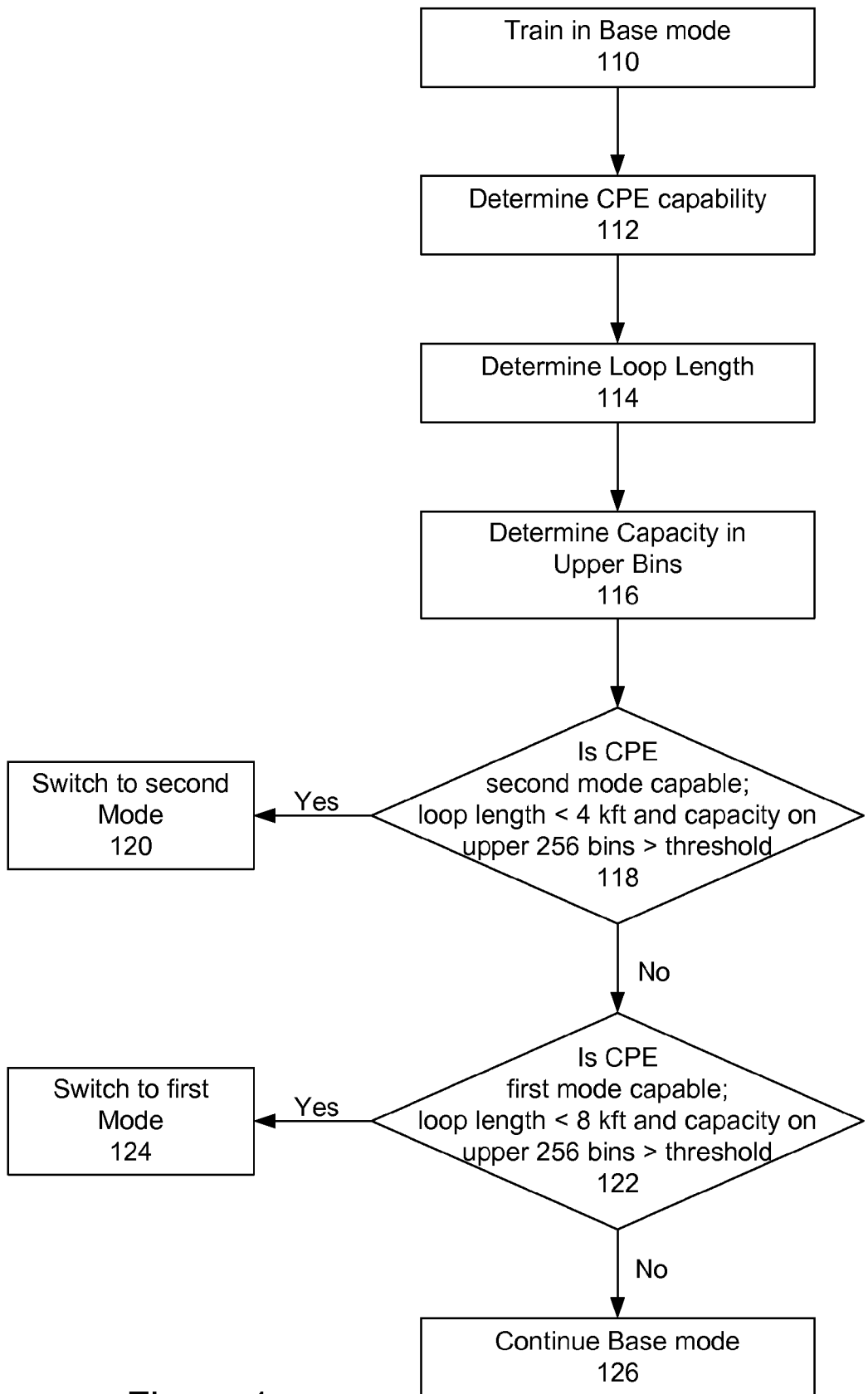
FIG. 1 is a flowchart illustrating a method for selecting an optimal operation mode according to an embodiment of an aspect of the present inventions.

The following description is intended to convey a thorough understanding of the inventions by providing a number of specific embodiments and details involving mode selection applications. It is understood, however, that the inventions are not limited to these specific embodiments and details, which are exemplary only. It is further understood that one possessing ordinary skill in the art, in light of known systems and methods, would appreciate the use of the inventions for their intended purposes and benefits in any number of alternative embodiments, depending upon specific design and other needs.

An embodiment of the present inventions is directed to selecting an optimal mode for ADSL operation based on certain conditions. An embodiment of the present invention may provide switching among different modes (e.g., three modes) at both the CO and CPE ends. The switching may be performed based on certain conditions, such as near/far end capability, loop length and capacity in the upper bands of modes of operation.

According to an embodiment of the present invention, a CO unit controls the mode selection and a CPE unit will follow the CO unit's selection. Initially after power up, a modem starts training in a base mode, in this example, Annex A mode. Based on a CO loop length (which may be measured by a total gain calculation), the modem may switch to a different mode, which may include a first mode or a second mode. If the modem is retraining due to errors in data mode or due to failure in startup, the unit may assume that the same or similar loop conditions are maintained. Therefore, the modem may start immediately in the same mode as used before.

Additional switching conditions may take into account noise in an upper band of the first and second modes. For example, if a capacity in the upper 256 bins in the first mode is lower then a threshold value, the unit may switch back to the base mode, e.g., ADSL Annex A mode. After full retrain is triggered in the base mode (e.g., Annex A), if a low capacity in first mode is determined, the modem may switch automatically back to the base mode. If modem is retraining, the modem may switch back to the first mode in order to re-measure the capacity in the upper 256 bins and make a decision for a next startup. Similarly, if a low capacity on the upper 512 bins is determined in a second mode, the unit may switch to the first mode. In this mode, the modem may switch back to second mode after full retrain.

According to an exemplary embodiment of the present invention, the base mode may represent Annex A (or other Annex mode) or other mode that is generally supported in most modems. The base mode may represent a mode of operation supporting downstream ADSL data rates of up to 12 Mb/s, utilizing 256 bins. The first mode may represent a mode of operation compatible with ADSL+ or other mode of operation that provides downstream data rates up to 26 Mb/s with downstream bandwidth extended up to 2.2 MHz, utilizing 512 bins. The second mode may represent a mode of operation compatible with ADSL Quad or other mode of operation that provides downstream rates up to 50 Mb/s, with Quad spectrum support, and with downstream bandwidth extended up to 3.75 MHz, utilizing 1024 bins. According to an embodiment of the present invention, other applications with varying modes of operation including a base mode, a first mode and a second mode may implement the inventive aspects discussed above and detailed further below. For example, the first mode provides a higher data rate than the base mode and the second mode provides a higher data rate than the first mode. In addition, while the illustrative examples discuss three modes of operation, additional modes of operation may be implemented within the context of the embodiments of the present inventions. For example, switching among additional modes of operation may be implemented in accordance with the embodiments of the present inventions. Similarly, the concepts of the embodiments of the present invention may be implemented within the context of two modes of operation.

FIG. 1 is a flowchart illustrating a method for selecting an optimal operation mode according to an embodiment of an aspect of the present inventions. At step 110, a modem may train in a base mode, such as Annex A mode. At step 112, CPE capability may be determined at the CO. For example, the CO may determine whether the CPE is capable of supporting certain modes, such as the first mode and the second mode. If the CPE is not capable of supporting a higher mode, such as a second mode, the CO may then not consider operating in the second mode. At step 114, a loop length may be determined. The loop length may be measured from the CO modem to the CPE modem. For example, certain modes may be more optimal for certain loop lengths. For example, for second mode of operation, the loop length may range from zero to approximately 4 kilofeet; for first mode of operation, the loop length may range from approximately 4 to 8 kilofeet and for base mode operation, the loop length may be above approximately 8 kilofeet. Other ranges of loop lengths for the various modes of operation may be implemented.

At step 116, a capacity on the upper bins may be determined. For example, if the capacity of the upper bins is below a predetermined threshold, the modem may switch back to a lower mode to conserve resources and promote efficiency. At step 118, certain determinations may be made, including a CPE second mode capability, whether the loop length is below a certain threshold and whether the capacity of the upper bins is above a certain threshold. If the conditions are satisfied, the modem may switch to the second mode, at step 120. At step 122, certain determinations may be made, including a CPE first mode capability, whether the loop length is below a certain threshold and whether the capacity of the upper bins is above a certain threshold. If the conditions are satisfied, the modem may switch to the first mode, at step 124.

At step 126, if the conditions are not satisfied, the modem may continue to operate in the base mode, e.g., Annex A.

The CO unit may control and determine an optimal rate selection based on loop length, capability and upper band capacity. Both CO/CPE units may use historical data to start immediately with a previously selected mode. This will shorten the startup time drastically after full retrain with the same loop conditions.

At each startup in all modes, the modem may monitor the loop length, modem capability and capacity in the upper band to determine an optimal mode of operation. The loop length analysis may be based on C/R Reverb1 signals (see G.992.1 standard), rather than handshake gain settings. The C/R Reverb1 signal (see G.992.1 standard) is more reliable since these signals use full transmitting power to estimate the loop attenuation.

The capacity in the upper band may be calculated by the CPE unit and transferred to the CO unit via a signal (e.g., based on R MSG RA signal from G.992.1 standard). The CO decision to switch or not to switch may be transferred back to the CPE unit via another signal (e.g., based on C MSG RA signal from G.992.1 standard).

Figure 2:
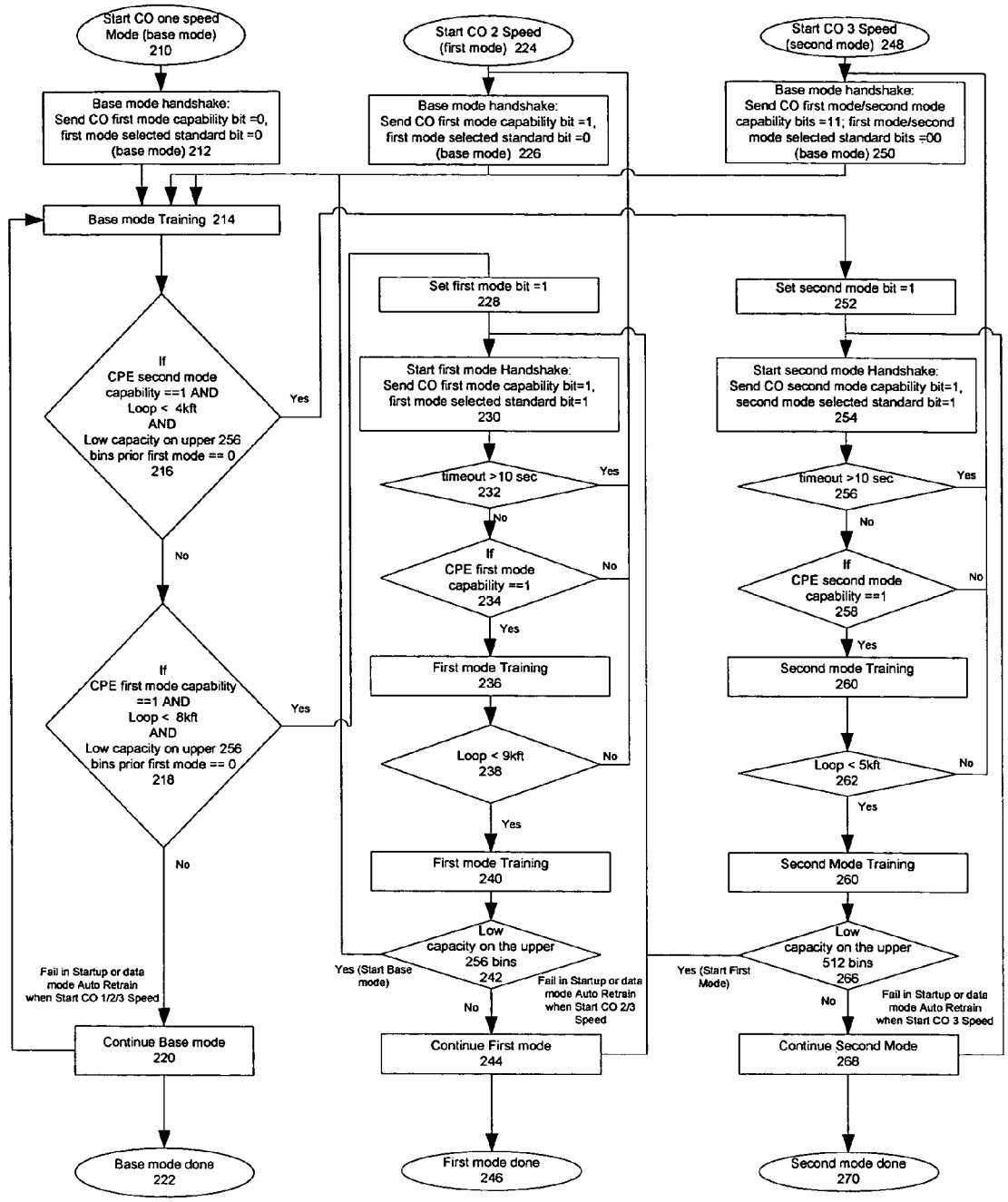
FIG. 2 is a flowchart illustrating a method for selecting an optimal operation mode at a CO according to an embodiment of the present inventions.

FIG. 2 is a flowchart illustrating a method for selecting an optimal operation mode at a CO according to an embodiment of the present inventions. FIG. 2 illustrates CO operation for selecting an optimal mode during full retrain. At step 210, CO may start at a base mode, e.g., Annex A. As the master, the CO may first attempt startups in the base mode and then determine the capabilities of the CPE during handshake sessions. At step 212, a handshake session may be performed for the base mode. During the handshake session, a CO capability bit for a first mode set at zero (indicating that the CO is not capable of first mode operation) may be sent and a first mode selected standard bit set at zero may be sent (indicating base mode startup).

At step 224, CO may start at a first mode. The first mode may represent a mode at a higher speed than the base mode. At step 226, a handshake session may be performed for the base mode. During the handshake session, a CO first mode capability bit set at 1 may be sent (indicating first mode capability) and a first mode selected standard bit set at 0 may be sent (indicating base mode startup).

At step 248, CO may start at a second mode. The second mode may represent a mode at a higher speed than the first mode and the base mode. At step 250, a handshake session may be performed for the base mode. During the handshake session, a CO first mode, second mode capability bit set at 11 may be sent (indicating first mode and second mode capability) and a first mode/second mode selected standard bit set at 00 may be sent (indicating base mode startup).

At step 214, training at the base mode may be performed. For example, the training may be performed up to C Message 1 (see G.992.1 standard). At step 216, it may be determined whether a CPE is capable of supporting the second mode, whether a loop length is below a threshold and whether low capacity is detected on an upper number of bins. The loop length may be determined by a received power level calculation. In another example, an Analog Gain Control calculation may be used to determine a loop length. History of the upper 256 bins may be determined. For example, capacity on the upper 256 bins may be dependent on noise, which may have improved since a last startup attempt in the first mode. Therefore, if previous startup attempts in the first mode resulted in Annex A because of low capacity, the first mode start up mode may be again attempted. If second mode operation is determined appropriate, a second mode bit may be set to 1 in a message (e.g., info 2), at step 252.

At step 218, it may be determined whether a CPE is capable of supporting a first mode, whether a loop length is below a threshold and whether low capacity is detected on an upper number of bins. The loop length may be determined by a received power level calculation. In another example, an Analog Gain Control calculation may be used to determine a loop length. History of the upper 256 bins may be determined. For example, capacity on the upper 256 bins may be dependent on noise, which may have improved since a last startup attempt in the first mode. Therefore, if previous startup attempts in the first mode resulted in Annex A because of low capacity, the first mode start up mode may be again attempted. If a first mode of operation is determined appropriate, a first mode bit may be set to 1 in a message (e.g., info 2), at step 228.

Otherwise, Annex A operation may continue at step 220. If a fall in startup or data mode is determined, auto retrain may be performed by a loop to step 214. At step 222, Annex A operation may be completed.

As shown in FIG. 2, startup is first attempted in the base mode, e.g., ADSL Annex A. The CO is the master and the CPE is the slave. For example, if the CPE is second mode capable and the loop length can support second mode operation, the code may automatically switch during Handshake/Training to startup in the second mode. If the CPE is first mode capable and the loop length can support first mode operation, the code may automatically switch during Handshake/Training to start up in the first mode. If the loop is too long for either the second mode or first mode operation, then the base mode startup is continued even if the CPE is second mode or first mode capable. Handshake/Training for the second mode evaluates the capacity on the upper 512 bins. If the capacity is low, startup is switched to the first mode. Handshake/Training for the first mode evaluates the capacity on the upper 256 bins. If the capacity is low, startup is switched to the base mode.

Handshake/Training for the base mode, first mode and second mode evaluates the capability of the remote unit and performs loop analysis. This handles a change in the CPE (e.g., the CPE is swapped) or loop as well as accelerates the retrain process the first mode and the second mode.

In order to avoid continual switching between the modes, the base mode Handshake/Training may check the history (e.g., data from previous first mode startup attempts) of the upper 256 bin capacity evaluation. The first mode Handshake/Training may check the history (e.g., data from previous second mode startup attempts) of the upper 512 bin capacity evaluation. In addition, the threshold value for first mode loop analysis and the second mode loop analysis may differ slightly from the threshold used for ADSL loop analysis performed during Handshake/Training. Further, if a retrain occurs in the base mode, the history (e.g., data from previous first mode and second mode startup attempts) of the upper 256/512 bin capacity evaluations may be checked again. Capacity on the upper bins is dependent on noise, which may have improved since the last startup in the first mode or second mode. Therefore, if previous startup attempts in the first mode or second mode resulted in the base mode because of low capacity, the first mode or second mode startup is again attempted.

An embodiment of the present invention provides for switching to one mode to the other in order to achieve optimal performance. At step 216, based on certain conditions, second mode operation may be determined to be appropriate. At step 252, the second mode bit may be set to 1 in a message (e.g., info 2) to CPE. At step 254, the second mode handshake may be performed where CO second mode capability bit is set to 1 and second mode selected standard bit is set to 1. At step 256, it may be determined whether a response is received from the CPE within a predetermined time period (e.g., 10 seconds). If a response is received, it may be determined whether the CPE is capable of supporting second mode operation (e.g., whether CPE second mode capability is set to 1), at step 258. If so, second mode training may be performed, at step 260. For example, second mode training may be performed up to C Message 1 (see G.992.1 standard). At step 262, it may be determined whether loop length is less than a threshold amount (e.g., 5 kilofeet, etc.) based on a calculation, such as a received power level calculation (e.g., total_AGC calculation). If not, the base mode handshake may be performed at step 250. At step 264, second mode training may be performed. For example, second mode training may be performed up to C Reverb RA message (see G.992.1 standard). At step 266, it may be determined whether capacity is low on the upper bins. For example, whether the upper 512 bins are at low capacity. If the upper bins are at low capacity, first mode operation may be initiated at step 230. Otherwise, second mode operation may continue at step 268, via a loop to step 254. At step 270, second mode operation may be completed.

At step 218, based on certain conditions, first mode operation may be determined to be appropriate. At step 228, first mode bit may be set to 1 in a message (e.g., info 2) to CPE. At step 230, first mode handshake may be performed where CO first mode capability bit is set to 1 and first mode selected standard bit is set to 1. At step 232, it may be determined whether a response is received from the CPE within a predetermined time period (e.g., 10 seconds). If a response is received, it may be determined whether the CPE is capable of supporting first mode operation (e.g., whether CPE first mode capability is set to 1), at step 234. If so, first mode training may be performed, at step 236. For example, first mode training may be performed up to info 1. At step 238, it may be determined whether loop length is less than a threshold amount (e.g., 9 kilofeet) based on a calculation, such as a received power level calculation (e.g., total_AGC calculation). If not, base mode (e.g., Annex A) handshake may be performed at step 226. At step 240, first mode training may be performed. For example, first mode training may be performed up to C Reverb RA message (see G.992.1 standard). At step 242, it may be determined whether a capacity is low on the upper bins. For example, whether the upper 256 bins are at low capacity. If the upper bins are at low capacity, base mode operation may be initiated at step 214. Otherwise, first mode operation may continue at step 244, via a loop to step 230. At step 246, first mode operation may be completed.

Figure 3:
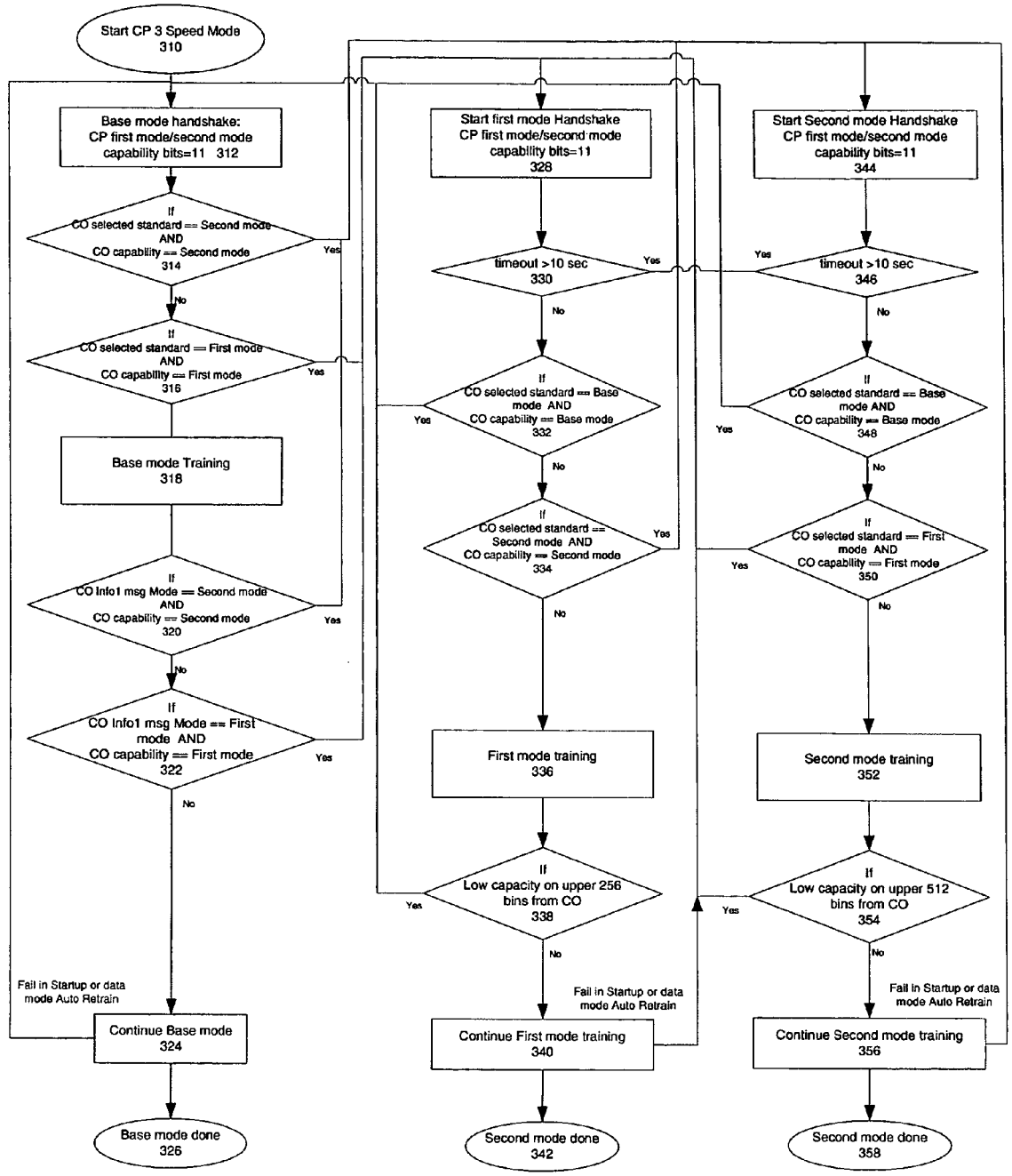
FIG. 3 is a flowchart illustrating a method for selecting an optimal operation mode at a CPE according to an embodiment of the present inventions.

FIG. 3 is a flowchart illustrating a method for selecting an optimal operation mode at a CPE according to an embodiment of the present inventions. At step 310, a CPE may be started at a second mode of operation. At step 312, Annex A handshake ma be performed where CPE indicates first mode/second mode capability (e.g., first mode/second mode bits at 11). At step 314, it may be determined whether the CO has selected second mode operation and whether CO is capable of second mode operation (e.g., CO selected standard is set to second mode and CO capability is set to second mode). If so, second mode handshake may be initiated at step 344 where CPE first mode/second mode capability bits are set at 11. At step 316, it may be determined whether the CO has selected first mode operation and whether CO is capable of first mode operation (e.g., CO selected standard is set to first mode and CO capability is set to first mode). If so, first mode handshake may be initiated at step 328 where CPE first mode/second mode capability bits are set at 11. Otherwise, base mode training may be performed, at step 318. For example, base mode training may be performed up to C Message 1 (see G.992.1 standard).

At step 320, it may be determined whether CO info 1 message mode is set to second mode and whether CO capability is set to second mode. If so, second mode handshake may be initiated at step 344. At step 322, it may be determined whether CO info 1 message mode is set to first mode and whether CO capability it set to first mode. If so, first mode handshake may be initiated at step 328. Otherwise, base mode operation may continue at step 324. If a fall in startup or data mode is detected, auto retrain may be performed via a loop to step 312. At step 326, base mode may be completed.

Based on the determinations performed at step 314 or step 320, second mode may be initiated. At step 344, second mode handshake may be initiated where CPE first mode/second mode capability bits are set at 11. At step 346, it may be determined whether a response is received from the CO within a predetermined time period (e.g., 10 seconds). If a response is received, it may be determined whether the CO selected standard is set at the base mode and whether CO capability is set to the base mode, at step 348. If so, base mode handshake may be initiated at step 312. Otherwise, it may be determined whether the CO selected standard is set at first mode and whether CO capability is set to first mode, at step 350. If so, first mode may be initiated where first mode handshake is performed at step 328. If not, second mode training may be performed, at step 352. For example, second mode training may be performed up to R Message RA (see G.992.1 standard). At step 354, low capacity may be determined at the upper bins. For example, it may be determined from the CO whether low capacity exists on the upper 512 bins. If so, first mode may be initiated where first mode handshake is performed at step 328. Otherwise, second mode training may be continue at step 356 via loop to step 344. At step 358, second mode operation is completed.

Based on the determinations performed at step 316 or step 322, first mode may be initiated. At step 328, first mode handshake may be initiated where CPE first mode/second mode capability bits are set at 11. At step 330, it may be determined whether a response is received from the CO within a predetermined time period (e.g., 10 seconds). If a response is received, it may be determined whether the CO selected standard is set at the base mode and whether CO capability is set to the base mode, at step 332. If so, the base mode handshake may be initiated at step 312. Otherwise, it may be determined whether the CO selected standard is set at second mode and whether CO capability is set to second mode, at step 334. If so, second mode may be initiated where second mode handshake is performed at step 344. If not, first mode training may be performed, at step 336. For example, first mode training may be performed up to R Message RA (see G.992.1 standard). At step 338, low capacity may be determined at the upper bins. For example, it may be determined from the CO whether low capacity exists on the upper 256 bins. If so, Annex A mode may be initiated where Annex A handshake is performed at step 312. Otherwise, first mode training may be continue at step 340 via loop to step 328. At step 342, first mode operation is completed.

Figure 4:
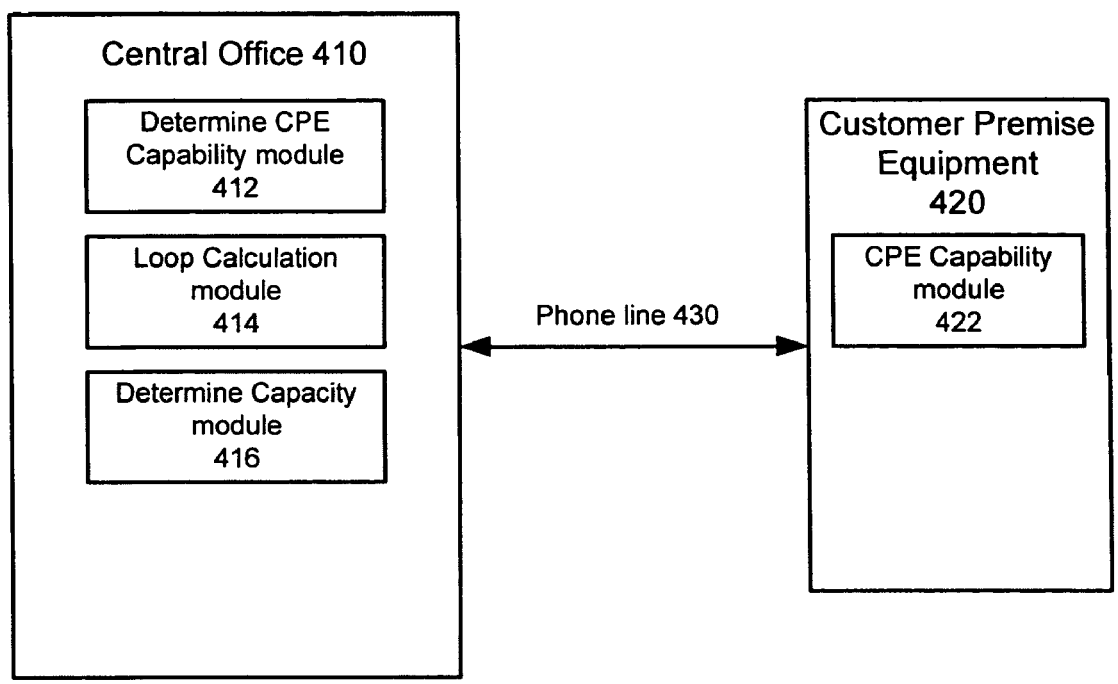
FIG. 4 is a diagram illustrating a system for selecting an optimal operation mode according to an embodiment of an aspect of the present inventions.

FIG. 4 is a diagram illustrating a system for selecting an optimal operation mode according to an embodiment of an aspect of the present inventions. FIG. 4 illustrates delivery of broadband communication services via ADSL over the POTS network. A central office 410 may be configured to receive broadband services which it assembles via central office ADSL line cards for transmission over a POTS phone line to a customer premise equipment 420. Examples of broadband services may include Internet, video conferencing, telephone services, movies on demand, broadcast media and/or other services. Customer premise equipment 420 may process and distribute the services to appropriate destination devices, such as computers, televisions, telephones, facsimile machines and/or other devices. Central office 410 and customer premise equipment 420 may communicate via phone line 430 or other communication link or medium.

In accordance with the embodiments of the present invention, CO 410 may include various modules, including code and computer program instructions, to perform certain functions. For example, Determine CPE capability module 410 may determine whether the CPE may operate in certain modes (e.g., first mode, second mode, etc.). Loop calculation mode 414 may calculate the loop length between the CO 410 and the CPE 420. The loop length may be determined by a total AGC calculation. Determine capacity module 416 may determine the capacity of upper bins. For example, the determination may be based on historical data. CPE 420 may provide the CO 410 with the CPE's capability via CPE capability module 422. Other functions and modules may be supported by both the CO 410 and the CPE 420.

As discussed above, the method and system for selecting an optimal mode may be incorporated at the CO end and at the CPE end. The CO end and the CPE end may include a modem, transceiver or other communication device.

The inventive aspects discussed above may be applied to various applications. For example, the base mode may include Annex A, the first mode may include GlobespanVirata's™ G.span™ and the second mode may include GlobespanVirata's™ V.span™, the disclosures of which are incorporated by reference in their entirety. The CO unit may include GlobespanVirata's™ Octane Plus™ CO unit and may be used with GlobespanVirata's™ Argone III Plus™ CPE unit, the disclosures of which are incorporated by reference in their entirety.

While the foregoing description includes many details and specificities, it is to be understood that these have been included for purposes of explanation only, and are not to be interpreted as limitations of the present inventions. Many modifications to the embodiments described above can be made without departing from the spirit and scope of the inventions.

The present inventions are not to be limited in scope by the specific embodiments described herein. Indeed, various modifications of the present inventions, in addition to those described herein, will be apparent to those of ordinary skill in the art from the foregoing description and accompanying drawings. Thus, such modifications are intended to fall within the scope of the following appended claims. Further, although the present inventions have been described herein in the context of a particular implementation in a particular environment for a particular purpose, those of ordinary skill in the art will recognize that its usefulness is not limited thereto and that the present inventions can be beneficially implemented in any number of environments for any number of purposes. Accordingly, the claims set forth below should be construed in view of the full breath and spirit of the present inventions as disclosed herein.

The invention claimed is:

1. A method for switching among a plurality of modes for ADSL modem operation, the method comprising the steps of: determining a far end modem's capability for supporting one or more of a base mode, a first mode and a second mode; determining a loop length between a near end modem and the far end modem; determining a capacity in an upper band of the first mode and the second mode; and selecting an appropriate mode based on a combination of the far end modem's capability, the loop length and the capacity in the upper band.

2. The method of claim 1, wherein the near end modem and the far end modem are trained in the base mode upon initial power up.

3. The method of claim 1, wherein the step of determining the capacity in the upper band further comprises determining whether the capacity in an upper 256 bins is below a threshold.

4. The method of claim 1, wherein the step of determining the capacity in the upper band further comprises determining whether the capacity in an upper 512 bins is below a threshold.

5. The method of claim 1, wherein the base mode is an Annex mode.

6. The method of claim 1, wherein the first mode is ADSL Plus.

7. The method of claim 1, wherein the second mode is ADSL Quad.

8. The method of claim 1, wherein the step of determining an appropriate mode is performed at a CO end.

9. The method of claim 8, wherein the steps are performed during a handshake/training session.

10. The method of claim 1, wherein the loop length is determined by a received power level calculation.

11. The method of claim 1, wherein the capacity in the upper band is determined at the far end modem and transmitted to the near end modem.

12. A system for switching among a plurality of modes for ADSL modem operation, the system comprising: a module for determining a far end modem's capability for supporting one or more of a base mode, a first mode and a second mode; a module for determining a loop length between a near end modem and the far end modem; and a module for determining a capacity in an upper band of the first mode and the second mode; wherein an appropriate mode is selected based on a combination of the far end modem's capability, the loop length and the capacity in the upper band.

13. The system of claim 12, wherein the near end modem and the far end modem are trained in the base mode upon initial power up.

14. The system of claim 12, wherein determining the capacity in the upper band further comprises determining whether the capacity in an upper 256 bins is below a threshold.

15. The system of claim 12, wherein determining the capacity in the upper band further comprises determining whether the capacity in an upper 512 bins is below a threshold.

16. The system of claim 12, wherein the base mode is an Annex mode.

17. The system of claim 12, wherein the first mode is ADSL Plus.

18. The system of claim 12, wherein the second mode is ADSL Quad.

19. The system of claim 12, wherein determining an appropriate mode is performed at a CO end.

20. The system of claim 19, wherein the system operates during a handshake/training session.

21. The system of claim 12, wherein the loop length is determined by a received power level calculation.

22. The system of claim 12, wherein the capacity in the upper band is determined at the far end modem and transmitted to the near end modem.

23. At least one processor readable medium for storing a computer program of instructions configured to be readable by at least one processor for instructing the at least one processor to execute a computer process for performing the method as recited in claim 1.

* * * * *